(12) United States Patent
Service

(10) Patent No.: US 7,670,442 B2
(45) Date of Patent: Mar. 2, 2010

(54) IRON PHOSPHATING PROCESS THAT REDUCES LASER SCALE RESULTING IN IMPROVED PAINT ADHESION

(75) Inventor: Daniel A. Service, Dundas (CA)

(73) Assignee: Henkel AG & Co. KGaA, Duesseldorf (DE)

( * ) Notice: Subject to any disclaimer, the term of this patent is extended or adjusted under 35 U.S.C. 154(b) by 115 days.

(21) Appl. No.: 11/770,250

(22) Filed: Jun. 28, 2007

(65) Prior Publication Data

US 2007/0267106 A1     Nov. 22, 2007

Related U.S. Application Data

(63) Continuation of application No. PCT/US2004/043937, filed on Dec. 28, 2004.

(51) Int. Cl.
*C23C 22/05*     (2006.01)
*C23C 22/07*     (2006.01)

(52) U.S. Cl. ............... 148/259; 106/14.12; 106/14.41; 106/14.42; 106/14.43; 106/14.44; 148/243; 148/253

(58) Field of Classification Search ............ 106/14.12, 106/14.44, 14.41, 14.42, 14.43; 148/243, 148/253, 259
See application file for complete search history.

(56) References Cited

U.S. PATENT DOCUMENTS

| | | | |
|---|---|---|---|
| 6,706,123 B2 | 3/2004 | Fristad et al. | |
| 6,723,178 B1 | 4/2004 | Bannai et al. | |
| 6,733,896 B2 * | 5/2004 | Dolan et al. | 428/472 |

* cited by examiner

*Primary Examiner*—Anthony J Green
(74) *Attorney, Agent, or Firm*—Mary K. Cameron

(57) ABSTRACT

A process for iron phosphating ferrous metal substrates having undesirable ferrous oxides thereon, such as that formed by laser cutting, that eliminates at least the pickling step in the phosphating process and provides good paint adhesion, and compositions of matter useful in the process.

20 Claims, No Drawings

IRON PHOSPHATING PROCESS THAT REDUCES LASER SCALE RESULTING IN IMPROVED PAINT ADHESION

CROSS-REFERENCE TO RELATED APPLICATIONS

This application is a continuation under 35 U.S.C. §365(c) and §120 of International Application No. PCT/US2004/043937, filed Dec. 28, 2004 and published in English as WO 2006/071226A1 on Jul. 6, 2006.

FIELD OF THE INVENTION

This invention relates to an improved process for iron phosphating ferrous metal substrates, preferably substrates having scale such as that formed by laser cutting, that eliminates at least the pickling step in the phosphating process and provides good paint adhesion and compositions of matter useful in the process.

BACKGROUND OF THE INVENTION

This invention relates to the well known general field of phosphate conversion coating of metals, particularly to the type of phosphate conversion coating known as iron side or non-crystalline conversion coating that is formed on predominantly ferriferous surfaces from a working phosphating composition that does not contain any substantial amount of any divalent cations that form insoluble phosphates, for example, zinc, nickel, cobalt, manganese, calcium, magnesium, or the like. For brevity hereinafter, this type of coating or type of composition for forming such a coating is called simply iron phosphate or a grammatical variation thereof.

In the automotive and industrial vehicle industry, metal parts are often cut and shaped prior to painting. In prior art processes for cutting metal, the cutting tool was typically a CNC machine or the like which cuts the metal by mechanical means, that is physical contact between the cutting tool and the workpiece to be cut. This method of cutting resulted in minimal scale or oxide being generated on the cut edge of the workpiece. The small amounts of scale and oxide enabled the manufacturer to phosphate and paint the workpiece after cutting with few paint adhesion problems, without additional steps to remove the scale and oxide. Thus, certain industries have developed processes and production lines that have no provision for removal of scale between the cutting stage and the phosphating stage.

With the introduction of laser forming and cutting of workpieces, a new problem of laser generated scale and oxide on the cut edge of workpieces arose. Manufacturers found that cutting ferrous metal with lasers resulted in sufficient scale and oxide formation at the cut edge of the workpiece to interfere with adhesion of subsequently applied paint layers and the corrosion resistance of the painted substrate. The poor paint adhesion caused appearance problems such as a "ribboning effect", as well as susceptibility to corrosion that was unacceptable to the manufacturers. Conventional phosphating, typically zinc phosphating, previously used as a treatment when mechanical cutting means were used, did not improve the paint adhesion on the laser cut edges enough to meet manufacturing requirements.

One attempted solution to poor paint adhesion on laser cut edges was to pickle and oil the workpieces after cutting and prior to phosphating. However, this method required the addition of a new step and its attendant costs to the processing of the metal pieces. The additional step requires equipment, skilled workers as well as floor space or transport that had not been part of the economics of manufacturing the metal parts when mechanical cutting was used. Also, pickling solutions are typically strongly acidic solutions and can be hazardous for workers and the environment. Due to the nature of the chemicals involved in pickling, typically sulfuric acid or nitric acid, there are also environmental and waste disposal issues that must be addressed if a manufacturer chooses to use this method. Thus, particularly for manufacturers who had no need to pickle prior to the introduction of laser cutting, it is desirable to provide a treatment that enhances the adhesion of paint to the laser cut workpieces without the addition of new steps or significant extra costs.

Iron phosphating processes for treatment of metal are known in the art. Another attempted solution to the paint adhesion problems caused by scale and oxide generated by laser cutting was to replace the zinc phosphating treatment used prior to painting in the prior art process with an iron phosphating treatment. However, conventional iron phosphating treatments alone, typically having pHs of 3.0 or more and total acid points of 6 to 14 did not provide sufficient improvement to paint adhesion.

SUMMARY OF THE INVENTION

In attempting to solve the afore-mentioned problems, Applicant developed a process for treating ferrous metal workpieces having laser scale and/or other ferrous oxides, on at least the cut edges of the workpiece that eliminates the need for a separate pickling step. Applicant surprisingly discovered that, in a single step, the amount of scale and oxide on the workpiece can be substantially reduced to an acceptable level and an iron phosphate coating applied. By an acceptable level of oxide on the workpiece it is meant that any remaining oxide does not interfere with adhesion of paint applied after the phosphating step or adversely affect corrosion resistance of the painted workpiece. Typically, the scale and/or oxide is reduced to a smut that does not interfere with phosphating, later paint adhesion or corrosion resistance of the painted workpiece. Accordingly, it is an object of the invention to provide a process for treating a ferrous metal workpiece having laser scale and/or other ferrous oxide on at least a portion of the workpiece comprising contacting the workpiece with a working phosphating treatment solution of the invention at a sufficient temperature and for a sufficient time such that said oxide and/or scale on the workpiece are reduced to an acceptable level and an iron phosphate coating is deposited on the workpiece and subsequently rinsing the coated ferrous metal workpiece.

It is another object of the invention to provide a process for treating ferrous metal workpieces comprising removing scale and/or oxide from the surface of the workpieces and depositing a coating comprising iron phosphate, wherein the removing and depositing steps take place in the same treatment bath, preferably in the same treatment step.

It is another object of the invention to provide an aqueous liquid concentrate that can be converted to a complete working liquid iron phosphating composition according to the inventions by dilution with water only.

It is yet another object of the invention to reduce the amount of scale and/or oxide to a smut on the workpiece surface and to coat the workpiece surface with a coating comprising iron phosphate in a single step.

The process of the invention comprises removing undesirable oxides, comprising ferrous oxides, from the surface of the workpiece and forming an iron phosphate coating in a single treatment bath, preferably in the same treatment step.

Except in the claims and the operating examples, or where otherwise expressly indicated, all numerical quantities in this description indicating amounts of material or conditions of reaction and/or use are to be understood as modified by the word "about" in describing the scope of the invention. Practice within the numerical limits stated is generally preferred, however. Also, throughout the description, unless expressly stated to the contrary: percent, "parts of", and ratio values are by weight or mass; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) between one or more newly added constituents and one or more constituents already present in the composition when the other constituents are added; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise, such counterions may be freely selected, except for avoiding counterions that act adversely to an object of the invention; the term "paint" and its grammatical variations includes any more specialized types of protective exterior coatings that are also known as, for example, lacquer, electropaint, shellac, porcelain enamel, top coat, base coat, color coat, and the like; the word "mole" means "gram mole", and the word itself and all of its grammatical variations may be used for any chemical species defined by all of the types and numbers of atoms present in it, irrespective of whether the species is ionic, neutral, unstable, hypothetical or in fact a stable neutral substance with well defined molecules; and the terms "solution", "soluble", "homogeneous", and the like are to be understood as including not only true equilibrium solutions or homogeneity but also dispersions.

DETAILED DESCRIPTION OF PREFERRED EMBODIMENTS

A concentrate composition according to the invention preferably comprises, more preferably consists essentially of, or still more preferably consists of, water and the following components:

(A) a component of dissolved phosphate anions;

(B) a component of sufficient dissolved acid to give the concentrate composition itself and a working composition made by diluting the concentrate composition with water only, an acidic pH value and at least 20 points total acid;

(C) a component of dispersed aromatic carboxylic acid; and (D) a component of viscosity increasing agent that is not part of any of components (A) through (C) as recited immediately above; and, optionally, none, one or more of dissolved aromatic carboxylic acid and the following components:

(E) a component of phosphating accelerator that is not part of any of components (A) through (D) as recited immediately above;

(F) a component of dissolved fluoride ions that are not part of any of components (A) through (E) as recited immediately above;

(G) a component of chelating agent that is not part of any of components (A) through (F) as recited immediately above;

(H) a component of acidity adjustment agent that is not part of any of components (A) through (G) as recited immediately above; and (J) a component of one or more surfactants that are not part of any of components (A) through (H) as recited immediately above.

In a composition according to the invention, component (A) preferably, at least for economy, is sourced to a composition according to the invention by at least one of orthophosphoric acid and its salts of any degree of neutralization. Component (A) can also be sourced to a composition according to the invention by pyrophosphate and other more highly condensed phosphates, including metaphosphates, which tend at the preferred concentrations for at least working compositions according to the invention to hydrolyze to orthophosphates. However, inasmuch as the condensed phosphates are usually at least as expensive as orthophosphates, there is little practical incentive to use condensed phosphates, except to prepare extremely highly concentrated liquid compositions according to the invention, in which condensed phosphates may be more soluble.

Whatever its source, the concentration of component (A) in a concentrate composition according to the invention, measured as its stoichiometric equivalent as $H_3PO_4$ with the stoichiometry based on equal numbers of phosphorus atoms, preferably is at least, with increasing preference in the order given, 15, 17, 19, 20, 21, 22, 23, 24, 25, 26, 27, 28, 29, 30, 31, 32 or 33% and independently preferably is not more than, with increasing preference in the order given, 60, 58, 56, 54, 52, 50, 48, 46, 44, 43, 42, 40, 39, 38, 37, 36, 35, or 34%. If the concentration of phosphate is too low, either the shipping cost of the concentrate will be high, because of its high water content, or the speed of phosphating in a working composition made from the concentrate composition generally will be slower than desirable. If this concentration of phosphate (or any other ingredient except water) is too high, the concentrate is more likely to become inhomogeneous on storage for a prolonged period.

Component (B), primarily for economy, is preferably supplied primarily by one or more of the acids listed in the description of component (A) above. Preferred amounts of acid are most practically specified in terms of actual or hypothetical working compositions to be made from the concentrate compositions. In such a working composition, it is preferred, independently for each characteristic, that:

the concentration of total acid be at least, with increasing preference in the order given, 15, 17, 19, 20, 21, 22, 23, 24, 25, 26, 27, 28, 29, 30, 31, 32 or 33 points and independently preferably is not more than, with increasing preference in the order given, 60, 58, 56, 54, 52, 50, 48, 46, 44, 43, 42, 40, 39, 38, 37, 36, 35, or 34 points; and the pH value of a working composition according to the invention be less than, with increasing preference in the order given, 4.0, 3.75, 3.5, 3.25, 3.0, 2.75, 2.65, or 2.55 and more than, with increasing preference in the order given 0, 1.0, 1.1, 1.2, 1.3, 1.4, 1.5, 1.6, 1.7, 1.8, 1.9, 2.0, 2.1, 2.2, 2.3 or 2.4.

("Points" are defined for this purpose as the number of milliliters (this unit of volume being hereinafter usually abbreviated as "ml") of 0.10 N NaOH solution required to titrate a 10 ml sample of the composition, to a phenolphthalein or pH 8.0 end point for total acid and a bromphenol blue or pH 3.8 end point for free acid. If necessary because of the initial pH value of the solution, 0.10 N strong acid titrant is substituted for the NaOH solution and the points are then recorded as negative.)

If the total acid points are too low, the total acid will be less effective in maintaining the desired free acid concentration in the vicinity of the substrate being coated, where free acid is consumed by the reactions that result in forming the phosphate coating. If the total acid points are too high, there will be excessive cost without any corresponding benefit and the desired dispersion of aromatic carboxylic acid will usually be destabilized.

If the working composition to be made from a concentrate composition according to the invention is not otherwise specified, a working composition made by mixing 1.0 part of the concentrate composition with 9.0 parts of deionized water is to be used for testing whether the concentrate composition conforms to the preferences for acid points and pH stated above.

Component (C) of aromatic carboxylic acid preferably is selected from acids that meet at least one, and more preferably more than one, most preferably all, of the following criteria, each of which is independently preferred: the molecules of the acids contain not more than, with increasing preference in the order given, 20, 18, 16, 14, 12, 10, 9, 8, or 7 carbon atoms each; and the acid is soluble in pure water at 17.5° C. to an extent of at least, with increasing preference in the order given, 0.02, 0.04, 0.06, 0.08, 0.10, 0.12, 0.14, 0.16, 0.18, or 0.20 parts of acid per 100 parts of water. The single most preferred aromatic carboxylic acid is benzoic acid.

The concentration of aromatic carboxylic acids, including both dispersed and dissolved acids present in a concentrate composition according to the invention, preferably is at least, with increasing preference in the order given, 0.5, 1.0, 1.5, 2.0, 2.5, 2.7, or 2.9% and independently preferably is not more than, with increasing preference in the order given, 10, 8, 6.0, 5.0, 4.5, 4.0, 3.5, or 3.1%. If either the concentration of aromatic carboxylic acid is too low, the desired benefit of protecting the phosphated substrate against flash rusting is less likely to be realized, while if the concentration is too high, the desired dispersion of aromatic carboxylic acid in the concentrate composition will usually be destabilized and/or there will be additional cost without any offsetting benefit.

Component (D) of viscosity increasing agent may be selected from a wide variety of viscosity increasing agents, such as natural and synthetic poly-saccharides and derivatives thereof, latexes incorporating a polymer with a viscosity strongly dependent on pH, and other materials, as known in the art. Xanthan gum is most preferred, available as Kelzan AR and ASX, from CP Kelco, Chicago Ill., and as Rhodopol 23 and Rhodopol 50 MC from Rhodia Inc., Baltimore, Md. When xanthan gum is used as the only ingredient included primarily as a viscosity increasing agent, it preferably has a concentration in a concentrate composition according to this invention that is at least, with increasing preference in the order given, 0.05, 0.10, 0.15, 0.20, 0.25, 0.30, 0.35, 0.40, 0.43, or 0.46% and independently preferably is not more than, with increasing preference in the order given, 1.5, 1.0, 0.90, 0.80, 0.75, 0.71, or 0.68%. If some other viscosity modifying agent is used, it preferably is used in a concentration to produce the same static viscosity in the composition as is produced by one of the above-stated preferred amounts of xanthan gum. If there is too little viscosity increasing agent in a composition according to this invention, the storage stability of the dispersed aromatic carboxylic acid is greatly reduced. With too much viscosity increasing agent, on the other hand, the concentrate would be impracticable to use on a large scale, because of the difficulty of pumping or otherwise efficiently moving it.

Component (E) of phosphating accelerating agent(s) preferably is included in a concentrate composition according to the invention, because without it the phosphating reaction in a working composition made by diluting the concentrate composition with water only normally will be undesirably slow. An accelerator, which may be one or more accelerators, when present in a concentrate composition according to the invention, preferably is selected from the group consisting of: 6 to 80 parts of chlorate ions per thousand parts of total working phosphating composition, this unit of concentration being freely used hereinafter for any constituent of any composition and being hereinafter usually abbreviated as ppt; 1.0 to 40 ppt of m-nitrobenzene sulfonate ions; 1.0 to 40 ppt of m-nitrobenzoate ions; 1.0 to 40 ppt of p-nitrophenol; 0.10 to 3.0 ppt of hydrogen peroxide in free or bound form; 0.4 to 50 ppt of hydroxylamine in free or bound form; 2.0 to 100 ppt of a reducing sugar; and 20 to 600 ppt of nitrate ions.

In one particularly preferred embodiment of the invention, component (E) contains, preferably consists essentially of, or more preferably consists of, two distinct subcomponents as follows: (E.1) a subcomponent of water soluble source(s) of dissolved hydroxylamine; and (E.2) a subcomponent of one or more dissolved nitroaromatic organic compounds.

Subcomponent (E.1) may consist of any of hydroxylamine itself, salts of hydroxylamine, complexes of hydroxylamine, and even oximes, which produce hydroxylamine by hydrolysis in aqueous solutions. Primarily for economy, safety, and convenience, hydroxylamine sulfate is most preferred. Whatever the source of subcomponent (E.1), its concentration, measured as its stoichiometric equivalent as hydroxylamine, in a concentrate composition according to the invention preferably is at least, with increasing preference in the order given, 0.04, 0.08, 0.15, 0.20, 0.25, 0.30, 0.35, 0.38, 0.40, or 0.42% and independently preferably is not more than, with increasing preference in the order given, 5, 3, 2.0, 1.0, 0.80, 0.70, 0.60, 0.55, 0.50, 0.47, 0.45, or 0.43%. If the concentration of hydroxylamine is too low, the rate of formation of the phosphating coating will be undesirably slow, while if this concentration is too high, the cost of a composition according to the invention will be increased without any offsetting benefit.

The preferred choice for subcomponent (E.2), which produces the maximum possible corrosion resistance, is meta-nitrobenzene sulfonic acid and/or its water soluble salts, especially the sodium salt. In a concentrate composition according to this embodiment, it is preferred, with increasing preference in the order given, that the concentration of subcomponent (E.2) be at least, with increasing preference in the order given, 0.3, 0.5, 0.7, 0.90, 1.0, 1.20, 1.30, 1.40, or 1.50% and independently preferably be not more than, with increasing preference in the order given, 10, 7, 5, 4.0, 3.0, 2.5, 2.20, 2.00, 1.90, 1.80, 1.75, 1.70, 1.65, 1.60, or 1.55%. Whatever is used for subcomponent (E.2), if its concentration is too low, the phosphate coating is likely to form at an impractically slow rate from a working composition made by diluting a concentrate composition according to the invention with water, while if the (E.2) concentration is too high, the composition will be excessively costly without any offsetting benefit.

The presence of optional component (F) of dissolved fluoride in a composition according to the invention is also preferred, at least in part because this component provides a buffering effect for free acid concentration and usually results in better coating quality. More preferably, this fluoride is sourced to the composition in two differing forms: uncomplexed fluoride supplied by hydrofluoric acid and/or one of its salts (which may be partially or totally neutralized); and complexed fluoride supplied by at least one of the acids $HBF_4$, $H_2SiF_6$, $H_2TiF_6$, $H_2ZrF_6$, and $H_2HfF_6$, and their salts (which also may be partially or totally neutralized). Among this group, NaBF$_4$ is most preferred, primarily for economy and ready commercial availability. Whatever material is used as the source, any fluoride added from a source of complexed fluoride is presumed, for the purpose of testing conformity with the preferences below, to remain as complexed fluoride in the concentrate composition, and likewise any fluoride added as uncomplexed fluoride is assumed to remain uncomplexed in the concentrate composition.

When both uncomplexed and complexed fluorides are present in a concentrate phosphating composition according to the invention:

the concentration of uncomplexed fluoride in the concentrate phosphating composition preferably is at least, with increasing preference in the order given, 0.10, 0.20, 0.40, 0.50, 0.60, 0.70, 0.80, 0.85, 0.90, 0.95, or 0.98% and independently preferably is not more than, with increasing preference in the order given, 10, 7, 5, 4.0, 3.0, 2.5, 2.0, 1.8, 1.6, 1.4, 1.30, 1.20, 1.10, or 1.00%;

independently, the concentration of complexed fluoride in the phosphating composition preferably is at least, with increasing preference in the order given, 0.10, 0.20, 0.30, 0.40, 0.50, 0.60, 0.70, 0.80, 0.85, 0.87, or 0.89% and independently preferably is not more than, with increasing preference in the order given, 8.5, 7.5, 6.5, 5.5, 4.5, 3.5, 2.5, 2.0, 1.5, 1.3, 1.10, 1.00, 0.95, or 0.92%; and, independently, the ratio of uncomplexed fluoride to complexed fluoride preferably is at least, with increasing preference in the order given, 0.1:1.00, 0.3:1.00, 0.5:1.00, 0.70:1.00, 0.80:1.00, 0.90:1.00, 1.00:1.00, or 1.10:1.00 and independently preferably is not more than, with increasing preference in the order given, 8:1.00, 6:1.00, 4:1.00, 3.0:1.00, 2.5:1.00, 2.0:1.00, 1.7:1.00, 1.50:1.00, 1.40:1.00, 1.30:1.00, 1.25:1.00, 1.20:1.00, 1.18:1.00, 1.16:1.00, 1.14:1.00, or 1.12:1.00.

If a phosphating composition according to the invention contains either fluoride only in uncomplexed form or fluoride only in complexed form, the total fluoride content of the composition preferably is at least, with increasing preference in the order given, 0.50, 1.0, 1.3, 1.6, or 1.8% and independently preferably is not more than, 8, 6, 4.0, 3.0, 2.5, 2.2, or 1.9%.

Component (G) of chelating agent is preferably present in a composition according to the invention, because if it is not present or its concentration is too low, the speed of formation of the phosphate conversion coating with a working composition made by diluting a concentrate composition according to the invention with water only will usually be less than desirable and/or a large amount of iron phosphate sludge is more likely to be formed during use of the composition. This component (G) preferably is selected from molecules each of which contains at least two moieties selected from the group consisting of —COOH, —OH, and mixtures thereof. Citric acid and gluconic acid and/or their salts are the most preferred chelating agents. If gluconic acid or citric acid is used, its concentration in a concentrate composition according to the invention preferably is at least, with increasing preference in the order given, 0.02, 0.04, 0.06, 0.08, 0.10, 0.12, 0.14, or 0.16% and independently preferably is not more than, with increasing preference in the order given, 1.0, 0.8, 0.6, 0.40, 0.35, 0.30, 0.25, or 0.20%. If salts, mixtures, and/or other chelating agents are used, the total concentration of component (G) is preferably measured as its stoichiometric equivalent as gluconic acid, the stoichiometry being based on equal numbers of chelating agent molecules, and when so measured has the same concentration preferences as for gluconic acid itself when used alone as component (G).

Component (H) of acidity adjustment agent also is normally preferably present in a composition according to the invention, if only because it is needed in a preferred process for making a composition according to the invention and removing it would add an unnecessary cost. An alkali metal hydroxide is most preferred as the alkalinizing agent, although any other sufficiently strongly ionized source of alkalinity is suitable. The concentration, measured as its stoichiometric equivalent as sodium hydroxide, with the stoichiometry being based on equal content of acid-neutralizing-alkalinity, preferably is at least, with increasing preference in the order given, 1.0, 2.0, 3.0, 4.0, 4.5, 4.8, or 5.1% and independently preferably is not more than, with increasing preference in the order given, 15, 12, 10, 8, 7.0, 6.5, 6.0, or 5.5%. If this concentration is either too low or too high, already stated preferences for Total Acid, and pH of working compositions made by diluting a concentrate composition according to the invention with water only will not usually be obtained, and the concentration preferences for component (H) are subordinate to these already stated preferences.

Component (J) of one or more surfactants is preferably included in a concentrate composition according to the invention, at least if the working compositions made by diluting the concentrate compositions according to the invention with water only are to be used with little or no pre-cleaning of the substrates to be phosphated, as is often preferred. On the other hand, if separate cleaning processes sufficient to assure thorough cleanliness of the substrate surfaces being phosphated are used, the surfactants may be and preferably are omitted to reduce the cost of the compositions. Preferred surfactants are acidified aliphatic polyethers, such as Antarox brand products from Solvay, Houston Tex.; alkoxylated glycols such as Triton brand products from Dow Chemical, Midland, Mich. phosphate esters, such as Rhodafac brand products from Rhodia, Baltimore, Md. and those shown in the working examples.

A concentrate composition according to the invention preferably does not develop any separation into two or more phases that is visually detectable with unaided normal human vision within a time interval of at least, with increasing preference in the order given, 10, 20, 40, 80, or 150 days after it has been manufactured.

For various reasons, almost always including at least a cost saving from elimination of an unnecessary ingredient, it is preferred that a composition according to this invention should be largely free from various materials often used in prior art compositions. In particular, compositions according to this invention in most instances preferably do not contain, with increasing preference in the order given, and with independent preference for each component named, more than 5, 4, 3, 2, 1, 0.5, 0.25, 0.12, 0.06, 0.03, 0.015, 0.007, 0.003, 0.001, 0.0005, 0.0002, or 0.0001% of each of (i) dissolved divalent cations of any of zinc, nickel, manganese, cobalt, copper, iron, calcium, and magnesium, (ii) dissolved cations of any kind with a valence of 3 or more, (iii) dissolved aluminum in any chemical form, and (iv) dissolved chromium in any chemical form.

A typical process according to the invention for making a selected mass of a concentrate composition according to the invention having a specified concentration of each of its ingredients, said ingredients including phosphoric acid, comprises at least the following operations: (I) providing a first mass of liquid that includes water, alkalinizing agent, dissolved viscosity increasing agent and dissolved aromatic carboxylic acid, said first mass having all of the following properties:

the first mass constitutes not more than, with increasing preference in the order given, 95, 85, 75, 65, 60, or 50% of the selected mass of the concentrate composition to be made;

the first mass comprises in dissolved salt form the entire content of aromatic carboxylic acid that is to be present in both dissolved and dispersed form in the selected mass of the concentrate composition to be made; the first mass further comprises sufficient dissolved free alkali, i.e., alkali in excess of any material originally added as alkali that has reacted with any acidic material also added to or present in said first mass of liquid, so that there is a ratio in said first mass of moles of free alkali to moles of anions of aromatic carboxylic acid that is at least, with increasing preference in the order given, 0.5:1.00, 1.0:1.00, 2.0:1.00, 3.0:1.00, 3.5:1.00, 4.0:1.00, or 4.4:1.00 and independently preferably is not more than, with increasing preference in the order given, 10:1.00, 8:1.00, 6.0:1.00, 5.5:1.00, 5.0:1.00, 4.8:1.00, or 4.6:1.00; and (II) adding a liquid solution of phosphoric acid in water to said first mass slowly with stirring until the entire content of phosphoric acid to be included in the selected mass of concentrate composition has been added to and mixed with said first mass to form a second liquid mass.

The second liquid mass may or may not constitute the entire selected mass of concentrate composition to be made. If it does not, any additional ingredients needed are preferably added after operation (II) as described above, except that: any surfactant and/or any viscosity increasing agent that has a viscosity that does not decrease when acidized may equally preferably be added to the first mass or added to the second mass; and any acidic chelating agent to be included may equally preferably be included in the solution of phosphoric acid added during operation (II) as described above or added to the second mass.

Additionally and independently of the other preferences and of one another: any acid other than phosphoric acid or an aromatic carboxylic acid preferably is added after the second mass has been formed as described above; if hydrofluoric acid is one of the ingredients specified for the concentrate composition, it preferably is the last one, except possibly for water, added to the mixture of other ingredients; any ingredient other than water that is to be mixed into the second mass as described above preferably is dissolved in water when it is added; and if any material is required to be added after operation (II) as described above, stirring of the mixture is preferably maintained continuously from the beginning of the addition of phosphoric acid in operation (II) until all the specified ingredients to make the specified mass of concentrate composition have been mixed with one another.

It will be apparent to those skilled in the art that numerous trivial variations could be made in the process sequence as described above to achieve an equivalent result without departing from the spirit of the invention. For example, but without limitation: the first mass could be divided into two or more parts, each treated in the same manner as described above for the single first mass, and the resulting multiple second masses could be mixed together at the end to constitute the entire specified mass of concentrate composition; a single second mass could be divided into two or more parts, further materials added to at least one of the parts, and all of the resulting mixtures combined eventually to constitute the entire specified mass of concentrate composition; and/or operation (II) as described above could be interrupted before all of the required phosphoric acid has been added, then resumed later to complete operation (II).

In a process according to the invention for using a concentrate composition according to the invention, the concentrate is preferably diluted with an amount of water that is at least, with increasing preference in the order given, 2, 3, 4, 5, 6, 7, 8 or 9 times its own mass to constitute a working phosphating composition, which is then used for treating ferrous metal workpieces to remove laser scale and/or other oxides, comprising ferrous oxides, according to the invention.

For the particularly preferred specific embodiments as described above: the temperature during contact between the metal treated and a working composition made by diluting a concentrate composition according to the invention preferably is in a range from, with increasing preference in the order given, 21° C. to 85° C., 25° C. to 70° C., or 30° C. to 65° C.; the time of contact preferably is in a range from, with increasing preference in the order given, 5 seconds (hereinafter "sec") to 15 minutes (hereinafter "min"), 15 sec to 10 min, or 30 sec to 5 min; and the add-on mass of the phosphate coating formed preferably is in a range from, with increasing preference in the order given, 12 to 1600, 98 to 975, or 285 to 700, milligrams per square meter (hereinafter "mg/m$^2$") of surface treated.

For the particularly preferred specific embodiments as described above a working phosphating composition according to the invention preferably has a pH of less than 3 and a 25-45 total acid points. A preferred working phosphating composition that reduces laser scale and/or ferrous oxides on a ferrous metal substrate and forms a phosphate conversion coating on the ferrous metal substrate with which it is contacted, in a single step, comprises water and:

(A) 1.5% to 10% by weight dissolved phosphate ions; based on a stoichiometric equivalent as $H_3PO_4$; (B) 20 to 50 points of total acid; (C) 0.05% to 1.0% of at least one aromatic carboxylic acid containing from 7 to 20 carbon atoms; and further comprises at least one member selected from the group consisting of: (D) 0.01 to 1.5% of xanthan gum or optionally a viscosity modifying agent other than xanthan gum used in a concentration to produce a same "static" viscosity of the composition as the above stated amounts of xanthan gum; and (E) a phosphating accelerator in an amount sufficient to provide a working solution with a concentration of at least one member selected from the group consisting of 0.6 ppt to 8.0 ppt of chlorate ions, 0.10 ppt to 4.0 ppt of m-nitrobenzene sulfonate ions, 0.10 ppt to 4.0 ppt of m-nitrobenzoate ions, 0.10 ppt to 4.0 ppt of p-nitrophenol, 0.01 ppt to 0.30 ppt of hydrogen peroxide in free or bound form, 0.04 ppt to 5.0 ppt of hydroxylamine in free or bound form, 0.20 ppt to 10.0 ppt of a reducing sugar and 2.0 ppt to 60.0 ppt of nitrate ions; (F) at least one member selected from the group consisting of 0.01% to 1.0% of uncomplexed fluoride, 0.01 to 0.85% of complexed fluoride and mixtures thereof and wherein when both uncomplexed fluoride and complexed fluoride are present the ratio of uncomplexed fluoride to complexed fluoride is from 0.1:1.00 to 8:1.00 and when only uncomplexed fluoride or complexed fluoride is present the total fluoride content of the composition is from 0.050% to 0.8%; (G) from 0.02% to 1.0% of a chelating agent wherein the concentration is measured as its stoichiometric equivalent as gluconic acid; (H) 0.1% to 1.5% of an acidity adjustment agent; and (J) a component of one or more surfactants that is not part of any of components (A) through (H).

The invention will now be further described with reference to a number of specific examples, which are to be regarded solely as illustrative and not as restricting the scope of the invention.

EXAMPLES

Example 1

A typical iron phosphating bath used in the industry was formulated for use as a comparative example. Working baths 1 and 2, according to the invention, were formulated as shown in Table 1, and thereafter pH adjusted by the addition of $H_3PO_4$, only, to the desired pH level.

TABLE 1

Aqueous Working Bath Composition in ppt

| Ingredient | Comparative Bath | Working Bath 1 | Working Bath 2 |
|---|---|---|---|
| Xanthan gum | 0.15 | 0.50 | 0.50 |
| ANTAROX ™ LF-330 surfactant | 0.10 | 0.35 | 0.35 |
| TRITON ™ DF-16 surfactant | 0.17 | 0.56 | 0.56 |
| RHODAFAC ™ RP-710 surfactant | 0.53 | 1.75 | 1.75 |
| 50% solution of NaOH in water | 3.15 | 10.5 | 10.5 |
| 50% solution of gluconic acid in water | 0.17 | 0.56 | 0.56 |
| 75% solution of $H_3PO_4$ in water | 4.62 | 15.4 | 15.4 |
| 30% solution of hydroxylamine sulfate in water | 1.09 | 3.62 | 3.62 |
| Sodium xylene sulfonate | 1.05 | 3.50 | 3.50 |
| 70% solution of HF in water | 0.15 | 0.49 | 0.49 |
| Solid $NaBF_4$ | 0.11 | 0.35 | 0.35 |
| Solid benzoic acid | 0.90 | 3.0 | 3.0 |
| pH: Examples 1 and 2 were pH adjusted by the addition of additional amounts of $H_3PO_4$ | 4.5 | 2.5 | 3.0 |

Example 2

Parts and panels of hot rolled steel (HRS) and cold rolled steel (CRS) were used as substrates for this example. ACT CRS are cold rolled steel panels that are known industry standards used for comparative testing. Samples of both substrates were treated according to the invention, as well as being subjected to comparative treatments. All samples were cleaned with a conventional alkaline cleaner, tap water rinsed, treated with a treatment bath according to the invention or with a comparative treatment bath, tap water rinsed and sealed with Parcolene 99, a commercial sealant available from Henkel Corporation, and painted. The resulting articles were subjected to salt spray testing for 500 hours according to ASTM 1654 with the results shown in Table 2.

TABLE 2

Salt Spray Testing of Coated Articles

| | | SALT SPRAY ASTM 1654 (Procedure A, Method 2) Tested for 500 Hours | | | | FILM |
|---|---|---|---|---|---|---|
| ARTICLE** | pH (ID) | RANGE OF CREEP (mm) | BLISTERS | MEAN CREEP (mm) | ASTM RATING | THICKNESS (1/1000 inch) |
| Working Bath 1 | 2.5 (part 3) | 0 | 9VF | 0 | 9 | 2.51 |
| Working Bath 1 | 2.5 (part 4) | 0-4.0 spot | 8VF | 0.5 | 9 | 2.25 |
| Working Bath 2 | 3.0 (part 1) | 0 | 9VF | 0 | 9 | 2.11 |
| Working Bath 2 | 3.0 (part 5) | 0-5.0 spot | 8VF+ | 1 | 8 | 2.04 |
| Comparative Bath | 4.5 (part 2) | 0-26.0 | N/A | 18 | 0 | 2.25 |
| Comparative Bath | 4.5 (part 6) | 5.0-20.0 | 8VF | 11 | 2 | 2.04 |
| Working Bath 1 | 2.5 (panel 9) | 0-0.1 spot | none | 0.1 | 9 | 2.71 |
| Working Bath 2 | 3.0 (panel 8) | 0-2.5 spot | none | 0.2 | 9 | 2.6 |
| Comparative Bath | 4.5 (panel 7) | 3.0-14.5 | none | 11 | 2 | 2.38 |
| Working Bath 1 | 2.5 (ACT CRS) | 0 | none | 0 | 10 | |
| Working Bath 2 | 3.0 (ACT CRS) | 0 | none | 0 | 10 | |
| Comparative Bath | 4.5 (ACT CRS) | 30% peeling of paint | none | N/A | 0 | |

**HRS unless otherwise noted

Example 3

Paint adhesion was tested for workpieces sustaining an impact on a cut edge. The test sample was a workpiece that included a laser cut edge; the laser cut edge had scale resulting from the laser cutting. HRS samples from Example 1 were subjected to impacts perpendicular to the main plane of the part at a point on the plane close to the laser cut edge. The impacts resulted in both workpieces receiving a dent of approximately the same size; workpiece A (Working Bath 2) showed no change in the paint on the laser cut edge, workpiece B (Comparative Bath) showed delamination of the paint on the laser cut edge along the length of the edge that was deformed by the impact.

Table 3 shows physical data for ACT CRS test panels tested after coating and prior to salt spray testing, showing performance comparable to a conventional iron phosphating bath.

TABLE 3

| | PHYSICAL TESTING | | |
| --- | --- | --- | --- |
| | IMPACT | | |
| ARTICLES: ACT CRS | CONCAVE | CONVEX | FILM THICKNESS (MILS) |
| | ASTM D2794 | | |
| Working Bath 1 | 56 | 4 | 3.8 |
| Working Bath 2 | 60 | 4 | 5.55 |
| Comparative Bath | 68 | 4 | 3.81 |

ACT CRS control panels were previously tested for impact and then placed in salt spray

Example 4

Samples of ACT CRS were treated according to the invention, as well as being subjected to comparative treatments. Working Bath 3 was the same as Working Bath 1, but was pH adjusted to pH 3.5 by the addition of $H_3PO_4$, only. All test panels were cleaned with a conventional alkaline cleaner, tap water rinsed, treated with a treatment bath according to the invention or with a comparative treatment bath, and tap water rinsed. No seal was applied. The treated samples were subjected to salt spray according to ASTM 1654 with the results shown in Table 4.

TABLE 4

| | SALT SPRAY ASTM 1654 HRS. TESTED | | MEAN | ASTM |
| --- | --- | --- | --- | --- |
| Treatment Bath | 336 | 504 | CREEP (mm) | RATING |
| Working Bath 1 | 0-1.1 s | 0-3.0 | 0.5 | 9 |
| Working Bath 2 | 0 | 0-2.1 s | 0.1 | 9 |
| Working Bath 3 | 0-0.2 s | 0-2.0 s | 0.2 | 9 |
| Comparative Bath | 2.6-5.9 | 5.5-12.0 | 6 | 4 |

Although the invention has been described with particular reference to specific examples, it is understood that variations and additional embodiments of the invention described herein will be apparent to those skilled in the art without departing from the scope of the invention as defined in the claims to follow.

What is claimed is:

1. A liquid concentrate composition of matter that when mixed with 9 times its own mass of water is a solution that forms a phosphate conversion coating on a solid metal substrate with which it is contacted, said concentrate composition comprising water and:
   (A) a component of dissolved phosphate anions in an amount sufficient to form the phosphate conversion coating on the substrate from a working composition made by diluting the concentrate composition with water only;
   (B) a component of sufficient dissolved acid to give the concentrate composition itself and a working composition made by diluting the concentrate composition with water only, an acidic pH value of less than 3 and at least 20 points total acid;
   (C) a component of dispersed aromatic carboxylic acid in an amount sufficient for the working composition to protect the phosphated substrate against flash rusting; and
   (D) a component of viscosity increasing agent that is not part of any of components (A) through (C) as recited immediately above.

2. The liquid concentrate composition of claim 1 further comprising at least one member selected from the group consisting of:
   (E) a component of phosphating accelerator that is not part of any of components (A) through (D);
   (F) a component of dissolved fluoride ions that is not part of any of components (A) through (E);
   (G) a component of chelating agent that is not part of compounds (A) through (F);
   (H) a component of acidity adjustment agent that is not part of any of components (A) to (G); and
   (J) a component of one or more surfactants that is not part of any of components (A) through (H).

3. The liquid concentrate composition of claim 1 comprising:
   (A) 15% to 60% by weight dissolved phosphate ions; based on a stoichiometric equivalent as $H_3PO_4$;
   (B) 20 to 50 points of total acid when diluted to working strength;
   (C) 0.5% to 10.0% of at least one aromatic carboxylic acid containing from 7 to 20 carbon atoms;
   (D) 0.05 to 1.5% of xanthan gum or optionally a viscosity modifying agent other than xanthan gum used in a concentration to produce a same "static" viscosity of the composition as the above stated amounts of xanthan gum; and
   (E) a phosphating accelerator in an amount sufficient to provide a working solution with a concentration of at least one member selected from the group consisting of 6 ppt to 80 ppt of chlorate ions, 1.0 ppt to 40 ppt of m-nitrobenzene sulfonate ions, 1 ppt to 40 ppt of m-nitrobenzoate ions, 1.0 ppt to 40 ppt of p-nitrophenol, 0.10 ppt to 3.0 ppt of hydrogen peroxide in free or bound form, 0.4 ppt to 50 ppt of hydroxylamine in free or bound form, 2.0 ppt to 100 ppt of a reducing sugar and 20 ppt to 600 ppt of nitrate ions.

4. The liquid concentrate composition of claim 3 wherein component (E) comprises at least two subcomponents (E.1) and (E.2) wherein (E.1) comprises a water soluble source of hydroxylamine and (E.2) comprises at least one nitroaromatic organic compound.

5. The liquid concentrate composition of claim 3 further comprising:
   (F) at least one member selected from the group consisting of 0.1% to 10% of uncomplexed fluoride, 0.1 to 8.5% of complexed fluoride and mixtures thereof and wherein when both uncomplexed fluoride and complexed fluoride are present the ratio of uncomplexed fluoride to complexed fluoride is from 0.1:100 to 8.1.00 and when only uncomplexed fluoride or complexed fluoride is present the total fluoride content of the composition is from 0.50% to 8%.

6. The liquid concentrate of claim 3 further comprising:
(G) from 0.02% to 1.0% of a chelating agent wherein the concentration is measured as its stoichiometric equivalent as gluconic acid.

7. The composition of claim 3 further comprising:
(H) 1% to 15% of an acidity adjustment agent.

8. The composition of claim 3 further comprising: (J) at least one surfactant.

9. The liquid concentrate composition of claim 1 comprising:
(B) a component of sufficient dissolved acid to give the concentrate composition itself and a working composition made by diluting the concentrate composition with water only, an acidic pH value of 2.5 or less and to give the working composition 20 to 50 points of total acid when diluted to working strength.

10. The liquid concentrate of claim 3 comprising:
(A) 15% to 50% by weight dissolved phosphate ions based on the stoichiometric equivalent as $H_3PO_4$;
(B) 20 to 40 points of total acid when diluted to working strength;
(C) 1.5% to 6% of the at least one aromatic carboxylic acid containing from 7 to 20 carbon atoms; and
(D) 0.20% to 1.0% of xanthan gum or optionally a viscosity modifying agent other than xanthan gum used in a concentration to produce the same static viscosity of the composition as the above stated amounts of xanthan gum.

11. The liquid concentrate of claim 5 further comprising:
(G) from 0.02% to 1% of a chelating agent wherein the concentration is measured as its stoichiometric equivalent as gluconic acid.

12. The liquid concentrate of claim 11 further comprising: (H) 1% to 15% of an acidity adjusting agent.

13. The liquid concentrate of claim 12 further comprising: (J) at least one surfactant.

14. A process for treating a ferrous metal workpiece having laser scale and for other ferrous oxide on at least a portion of the workpiece comprising:
a) contacting a ferrous metal workpiece having laser scale and for other ferrous oxide on at least a portion of the workpiece, in the absence of a separate acid pickling pretreatment, with a treatment solution comprising:
(A) a component of dissolved phosphate anions in an amount sufficient to form the phosphate conversion coating on the substrate;
(B) a component of sufficient dissolved acid to give the working composition an acidic pH value of less than 3 and 20 to 60 points total acid;
(C) a component of dispersed aromatic carboxylic acid in an amount sufficient for the working composition to protect the phosphated substrate against flash rusting; and
(D) optionally, a component of viscosity increasing agent that is not part of any of components (A) through (C) as recited immediately above;
at a sufficient temperature and a sufficient time such that said oxide and/or scale on the workplace are reduced in amount such that and an iron phosphate coating is deposited on the workpiece including on the portion of the workpiece that had laser scale and/or other ferrous oxide in a); and
b) rinsing the coated ferrous metal substrate with water.

15. The process of claim 14 wherein the working phosphating composition comprises:
(A) 1.5% to 10% by weight dissolved phosphate ions; based on a stoichiometric equivalent as $H_3PO_4$;
(B) 20 to 50 points of total acid; and
(C) 0.05% to 1.0% of at least one aromatic carboxylic acid containing from 7 to 20 carbon atoms; and
further comprises at least one member selected from the group consisting of:
(D) 0.01 to 1.5% of xanthan gum or optionally a viscosity modifying agent other than xanthan gum used in a concentration to produce a same "static" viscosity of the composition as the above stated amounts of xanthan gum;
(E) a component of phosphating accelerator that is not pad of any of components (A) through (D);
(F) a component of dissolved fluoride ions that is not part of any of components (A) through (E);
(G) a component of chelating agent that is not part of compounds (A) through (F);
(H) a component of acidity adjustment agent that is not part of any of components (A) to (G); and
(J) a component of one or more surfactants that is not part of any of components (A) through (H).

16. A working phosphating composition that reduces laser scale and/or ferrous oxides on a ferrous metal substrate and forms a phosphate conversion coating on the ferrous metal substrate with which it is contacted, in a single step, said concentrate composition comprising water and:
(A) 1.5% to 10% by weight dissolved phosphate ions; based on a stoichiometric equivalent as $H_3PO_4$;
(B) 20 to 50 points of total acid;
(C) 0.05% to 1.0% of at least one aromatic carboxylic acid containing from 7 to 20 carbon atoms; and
further comprises at least one member selected from the group consisting of:
(D) 0.01 to 1.5% of xanthan gum or optionally a viscosity modifying agent other than xanthan gum used in a concentration to produce a same "static" viscosity of the composition as the above stated amounts of xanthan gum; and
(E) a phosphating accelerator in an amount sufficient to provide a working solution with a concentration of at least one member selected from the group consisting of 0.6 ppt to 8.0 ppt of chlorate ions, 0.10 ppt to 4.0 ppt of m-nitrobenzene sulfonate ions, 0.10 ppt to 4.0 ppt of m-nitrobenzoate ions, 0.10 ppt to 4.0 ppt of p-nitrophenol, 0.01 ppt to 0.30 ppt of hydrogen peroxide in free or bound form, 0.04 ppt to 5.0 ppt of hydroxylamine in free or bound form, 0.20 ppt to 10.0 ppt of a reducing sugar and 2.0 ppt to 60.0 ppt of nitrate ions;
wherein said working composition has a pH of less than 3.0.

17. The working phosphating composition of claim 16 which further comprises at least one member selected from the group consisting of:
(F) a component of dissolved fluoride ions that is not part of any of components (A) through (E);
(G) a component of chelating agent that is not part of compounds (A) through (F);
(H) a component of acidity adjustment agent that is not part of any of components (A) to (G); and
(J) a component of one or more surfactants that is not part of any of components (A) through (H).

18. The working phosphating composition of claim 16 wherein component (E) comprises at least two subcomponents (E.1) and (E.2) wherein (E.1) comprises a water soluble source of hydroxylamine and (E.2) comprises at least one nitroaromatic organic compound.

19. The working phosphating composition of claim 16 which further comprises:
(F) at least one member selected from the group consisting of 0.01% to 1.0% of uncomplexed fluoride, 0.01 to 0.85% of complexed fluoride and mixtures thereof and wherein when both uncomplexed fluoride and complexed fluoride are present the ratio of uncomplexed fluoride to complexed fluoride is from 0.1:1.00 to 8.1.00 and when only uncomplexed fluoride or complexed fluoride is present the total fluoride content of the composition is from 0.050% to 0.8%;
(G) from 0.02% to 1.0% of a chelating agent wherein the concentration is measured as its stoichiometric equivalent as gluconic acid; and
(H) 0.1% to 1.5% of an acidity adjustment agent.

20. The working phosphating composition of claim 17 having a pH of 1 to 2.65 and a 25-45 total acid points.

* * * * *